United States Patent
Nakamoto et al.

(10) Patent No.: US 10,533,495 B2
(45) Date of Patent: *Jan. 14, 2020

(54) POWER GENERATION SYSTEM

(71) Applicant: MITSUBISHI HITACHI POWER SYSTEMS, LTD., Kanagawa (JP)

(72) Inventors: Yukimasa Nakamoto, Tokyo (JP); Kazunori Fujita, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 342 days.

This patent is subject to a terminal disclaimer.

(21) Appl. No.: 15/609,799

(22) Filed: May 31, 2017

(65) Prior Publication Data

US 2017/0260902 A1    Sep. 14, 2017

Related U.S. Application Data

(63) Continuation of application No. 14/439,073, filed as application No. PCT/JP2013/079151 on Oct. 28, 2013, now Pat. No. 9,777,629.

(30) Foreign Application Priority Data

Oct. 31, 2012 (JP) ................................. 2012-240726

(51) Int. Cl.
*F02C 6/04* (2006.01)
*F02C 3/30* (2006.01)
(Continued)

(52) U.S. Cl.
CPC ............... *F02C 6/04* (2013.01); *F01K 13/02* (2013.01); *F01K 23/10* (2013.01); *F02C 3/20* (2013.01);
(Continued)

(58) Field of Classification Search
CPC ...... F02C 6/04; F02C 3/20; F02C 3/30; F02C 6/00; F02C 6/18; F02C 6/06; F02C 3/305;
(Continued)

(56) References Cited

U.S. PATENT DOCUMENTS 4,743,516 A * 5/1988 Noguchi ........... H01M 8/04089
429/423
5,068,159 A * 11/1991 Kinoshita ........... H01M 8/0612
429/410
(Continued)

FOREIGN PATENT DOCUMENTS

CN    102449835    5/2012
CN    102456898    5/2012
(Continued)

OTHER PUBLICATIONS

International Search Report dated Nov. 19, 2013 in International (PCT) Application No. PCT/JP2013/079151.
(Continued)

*Primary Examiner* — Andrew H Nguyen
(74) *Attorney, Agent, or Firm* — Wenderoth, Lind & Ponack, L.L.P.

(57) ABSTRACT

This power generation system is provided with: a gas turbine having a compressor, a combustor and a turbine; a first compressed air supply line that supplies compressed air, which has been compressed by the compressor, to the combustor; a solid oxide fuel cell (SOFC) having an air electrode and a fuel electrode; a compressed air supply device capable of generating compressed air; and a second compressed air supply line that supplies compressed air, which has been compressed by the compressed air supply device to the SOFC. The fuel cell can thus be stably operated regardless of the operating state of the gas turbine.

1 Claim, 3 Drawing Sheets

(51) Int. Cl.
*F02C 6/18* (2006.01)
*H01M 8/04111* (2016.01)
*F01K 23/10* (2006.01)
*F02C 6/00* (2006.01)
*H01M 8/04082* (2016.01)
*F02C 3/20* (2006.01)
*F01K 13/02* (2006.01)
*H01M 8/124* (2016.01)

(52) U.S. Cl.
CPC .................. *F02C 3/30* (2013.01); *F02C 6/00* (2013.01); *F02C 6/18* (2013.01); *H01M 8/04111* (2013.01); *H01M 8/04201* (2013.01); *H01M 2008/1293* (2013.01); *H01M 2250/402* (2013.01); *Y02B 90/12* (2013.01); *Y02E 20/16* (2013.01)

(58) Field of Classification Search
CPC .... F01K 13/02; F01K 23/10; H01M 8/04111; H01M 8/04201; H01M 2250/402; H01M 2250/407
See application file for complete search history.

(56) References Cited

U.S. PATENT DOCUMENTS

| | | | | |
|---|---|---|---|---|
| 5,968,680 | A * | 10/1999 | Wolfe | H01M 8/04 429/425 |
| 6,544,675 | B1 * | 4/2003 | Kurita | H01M 8/0612 429/423 |
| 7,153,599 | B2 * | 12/2006 | Bunker | H01M 8/04007 429/415 |
| 7,184,875 | B2 * | 2/2007 | Ferrall | H01M 8/04373 429/413 |
| 7,410,713 | B2 * | 8/2008 | Balan | H01M 8/04022 429/415 |
| 7,563,527 | B2 * | 7/2009 | Tanaka | F02C 6/00 429/415 |
| 7,604,883 | B2 * | 10/2009 | Schaller | H01M 8/04007 429/437 |
| 9,482,110 | B2 * | 11/2016 | Ozawa | F01D 21/00 |
| 9,482,159 | B2 * | 11/2016 | Ozawa | F02C 9/40 |
| 9,777,629 | B2 * | 10/2017 | Nakamoto | F01K 23/10 |
| 9,806,358 | B2 * | 10/2017 | Nakamoto | H01M 8/04111 |
| 9,926,844 | B2 * | 3/2018 | Fujita | H01M 8/0662 |
| 9,941,534 | B2 * | 4/2018 | Berlowitz | C01B 3/34 |
| 10,107,190 | B2 * | 10/2018 | Manabe | F02C 6/00 |
| 10,305,125 | B2 * | 5/2019 | Wang | G05D 7/0635 |
| 2005/0095488 | A1 * | 5/2005 | Formanski | F04B 25/00 429/434 |
| 2012/0012783 | A1 * | 1/2012 | Scotto | H01M 8/04268 252/188.25 |
| 2014/0190144 | A1 * | 7/2014 | Ozawa | F02C 3/20 60/39.12 |
| 2015/0263368 | A1 * | 9/2015 | Nakamoto | H01M 8/0662 60/774 |
| 2015/0288009 | A1 * | 10/2015 | Manabe | H01M 8/04111 429/446 |
| 2015/0308297 | A1 * | 10/2015 | Nakamoto | F01K 23/10 60/772 |
| 2016/0006057 | A1 * | 1/2016 | Nakamoto | H01M 8/0662 429/429 |
| 2016/0190622 | A1 * | 6/2016 | Whyatt | H01M 8/0662 429/423 |

FOREIGN PATENT DOCUMENTS

| | | |
|---|---|---|
| JP | 2-86926 | 3/1990 |
| JP | 4-91324 | 3/1992 |
| JP | 10-12255 | 1/1998 |
| JP | 11-176455 | 7/1999 |
| JP | 2001-52727 | 2/2001 |
| JP | 2001-229961 | 8/2001 |
| JP | 2003-36872 | 2/2003 |
| JP | 2003-45444 | 2/2003 |
| JP | 2005-38817 | 2/2005 |
| JP | 2009-205930 | 9/2009 |
| JP | 2009-283178 | 12/2009 |
| JP | 2010-146934 | 7/2010 |

OTHER PUBLICATIONS

Written Opinion of the International Searching Authority dated Nov. 19, 2013 in International (PCT) Application No. PCT/JP2013/079151.
Office Action and Search Report dated Dec. 9, 2015 in Chinese Application No. 201380056427.7, with English translation.
Notification of Grant of Invention and Notification of Completion of Formalities for Registration dated Apr. 26, 2016 in Chinese Application No. 201380056427.7, with English translations.
Notification of Reason for Refusal dated Jul. 5, 2016 in corresponding Japanese Application No. 2012-240726, with English translation.
Notice of Allowance dated Sep. 30, 2016 in Korean Application No. 10-2015-7011133, with partial English translation.
Notice of Allowance dated Oct. 21, 2016 in Korean Application No. 10-2016-7023015, with partial English translation.
Office Action dated Jun. 14, 2018 in German Application No. 112013005205.9, with English translation.

* cited by examiner

POWER GENERATION SYSTEM

TECHNICAL FIELD

The present invention relates to a power generation system combining a fuel cell, a gas turbine, and a steam turbine.

BACKGROUND ART

The solid oxide fuel cell (hereinafter, referred to as SOFC) is known as a high efficiency fuel cell with a wide range of uses. The operating temperature of the SOFC is increased to increase the ionic conductivity, so air discharged from the compressor of a gas turbine can be used as air (oxidizing agent) supplied to the air electrode side. Also, high-temperature fuel that could not be used in an SOFC can be used as the fuel in the combustor of a gas turbine.

Therefore, various combinations of SOFC, gas turbine, and steam turbine have been proposed as power generation systems that can achieve high efficiency power generation, as disclosed in, for example, Patent Document 1. The combined system disclosed in Patent Document 1 includes an SOFC, a gas turbine combustor that burns exhaust fuel gas and exhaust air discharged from the SOFC, and a gas turbine having a compressor that compresses air for supply to the SOFC.

CITATION LIST

Patent Document

Patent Document 1: Japanese Unexamined Patent Application Publication No. 2009-205930A

SUMMARY OF THE INVENTION

Technical Problem

During normal operation of the conventional power generation system described above, air compressed by the compressor of the gas turbine is supplied to the combustor of the gas turbine, a portion of the air being supplied to the SOFC for use as an oxidizing agent. In this case, the pressure of the air compressed by the compressor fluctuates according to the operating state of the gas turbine, with the result that the pressure of the compressed air supplied to the SOFC also fluctuates according to the operating state of the gas turbine, leading to the risk of being incapable of maintaining a stable operating state of the SOFC. For example, the power generator is activated through the driving of the gas turbine; if the frequency of the power generator fluctuates, the gas turbine engages in output control in order to keep the frequency at a predetermined frequency. Specifically, the output of the gas turbine is adjusted by adjusting the amount of fuel supplied thereto; during this process, the pressure of the compressed air at the outlet of the compressor fluctuates, causing the pressure of the compressed air supplied to the SOFC to also fluctuate.

The present invention solves the problems described above, and has an object of providing a power generation system allowing a fuel cell to be stably operated regardless of the operating state of a gas turbine.

Solution to Problem

In order to achieve the object proposed above, a power generation system of the present invention comprises: a gas turbine having a compressor and a combustor; a first compressed air supply line for supplying first compressed air compressed by the compressor to the combustor; a fuel cell having an air electrode and a fuel electrode; a compressed air supply unit capable of generating second compressed air; and a second compressed air supply line for supplying second compressed air compressed by the compressed air supply unit to the fuel cell.

Thus, a compressed air supply unit is provided separately from the gas turbine compressor, with first compressed air compressed by the gas turbine compressor being supplied to the combustor via the first compressed air supply line, and second compressed air compressed by the compressed air supply unit being supplied to the fuel cell via the second compressed air supply line. Therefore, there is no fluctuation in the pressure of the air supplied to the fuel cell even if the pressure of the air supplied to the combustor fluctuates according to the operating state of the gas turbine. As a result, the fuel cell can be stably operated regardless of the operating state of the gas turbine.

The power generation system of the present invention comprises: a heat recovery steam generator for generating steam using exhaust gas from the gas turbine; and a steam turbine driven by steam generated by the heat recovery steam generator, the compressed air supply unit having a steam-driven fuel cell compressor and a steam supply line for supplying steam generated by the heat recovery steam generator to the fuel cell compressor.

Accordingly, when steam generated by the heat recovery steam generator is supplied to the fuel cell compressor via the steam supply line, the fuel cell compressor is driven by the steam to generate second compressed air, which is supplied to the fuel cell. The power generation system combines a fuel cell, a gas turbine, and a steam turbine, with steam generated within the system being used to drive the fuel cell compressor to generate second compressed air, and the second compressed air being supplied to the fuel cell to improve overall system efficiency.

In the power generation system of the present invention, the compressed air supply unit includes a fuel cell compressor and a drive motor for driving the fuel cell compressor.

Accordingly, the fuel cell compressor is driven by the drive motor to generate second compressed air, which is supplied to the fuel cell. Simply by providing the drive motor and the fuel cell compressor, the second compressed air can be supplied to the fuel cell independently of the gas turbine, allowing stable operation of the fuel cell to be ensured with a simple arrangement.

The power generation system of the present invention comprises: a first on/off valve capable of opening and closing the second compressed air supply line; a bypass line connecting the first compressed air supply line and the second compressed air supply line; and a second on/off valve for opening and closing the bypass line.

Accordingly, the second compressed air generated by driving the fuel cell compressor can be supplied to the combustor via the bypass line, allowing the amount of compressed air to be adjusted according to the operating state of the gas turbine or the fuel cell.

The power generation system of the present invention comprises a control unit capable of opening and closing the first on/off valve and the second on/off valve, the control unit closing the first on/off valve and opening the second on/off valve when the fuel cell is stopped.

Accordingly, when the fuel cell is stopped, the first on/off valve is closed to stop the supply of second compressed air from the compressed air supply unit to the fuel cell, and the second on/off valve is opened to start the supply of second compressed air from the compressed air supply unit to the gas turbine combustor, ensuring the amount of compressed air in the gas turbine and allowing the gas turbine to operate stably.

Effect of the Invention

In accordance with the power generation system of the present invention, first compressed air compressed by the compressor can be supplied to the combustor and second compressed air compressed by the compressed air supply unit can be supplied to the fuel cell, allowing the fuel cell to operate stably regardless of the operating state of the gas turbine.

DETAILED DESCRIPTION OF THE INVENTION

Preferred embodiments of the power generation system according to the present invention will now be described in detail with reference to the attached drawings. The present invention is not limited by these embodiments, and, when there is a plurality of embodiments, configurations that combine these embodiments are also included.

First Embodiment

The power generation system according to a first embodiment is a Triple Combined Cycle (registered trademark) that combines a solid oxide fuel cell (hereinafter, referred to as SOFC), a gas turbine, and a steam turbine. The Triple Combined Cycle can generate electricity in the three stages of the SOFC, the gas turbine, and the steam turbine by installing the SOFC on the upstream side of a gas turbine combined cycle power generation system (GTCC), so it is possible to achieve extremely high power generation efficiency.

Figure 1:
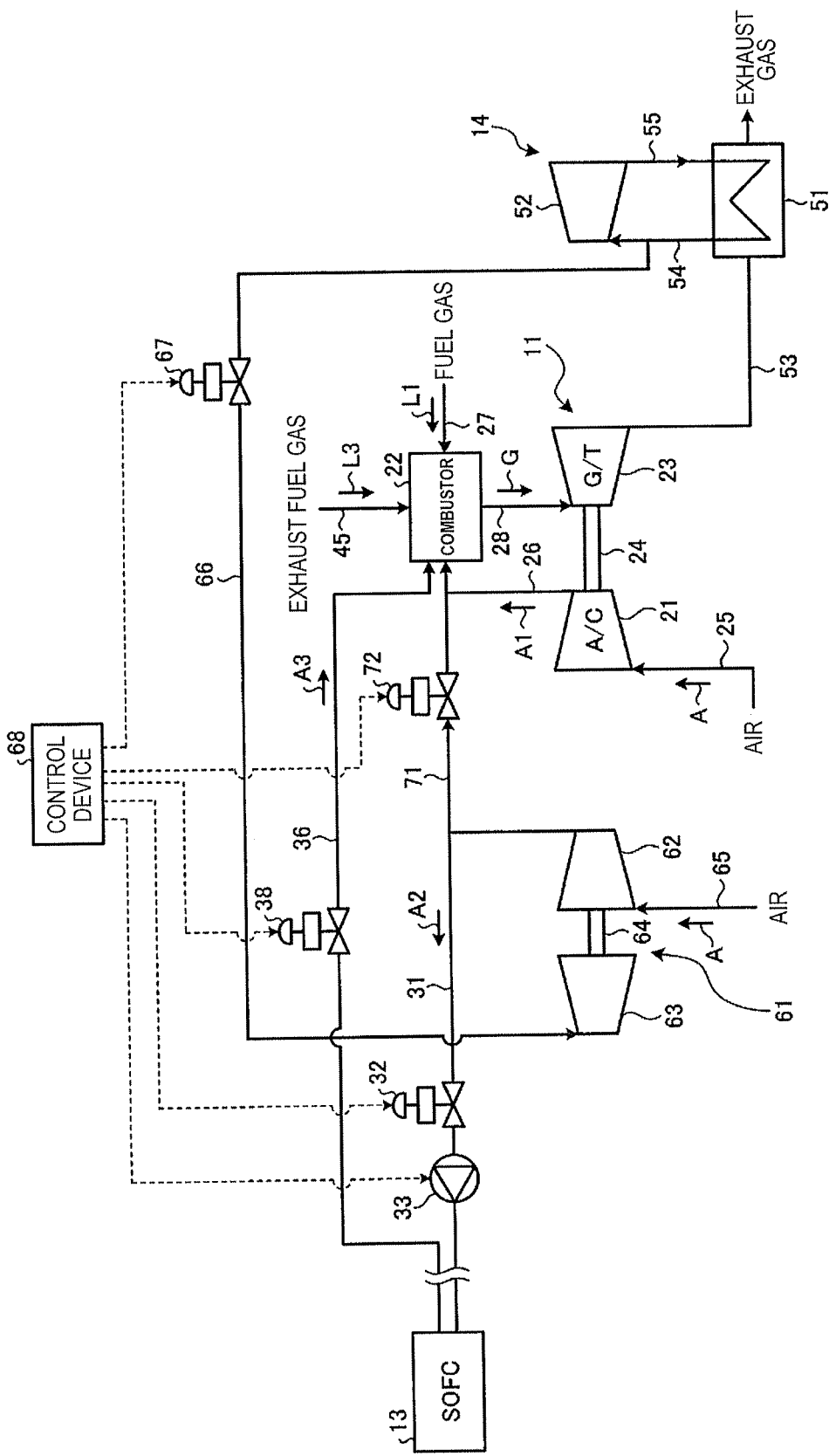
FIG. 1 is a schematic view illustrating a compressed air supply line in a power generation system according to a first embodiment of the present invention.
Figure 2:
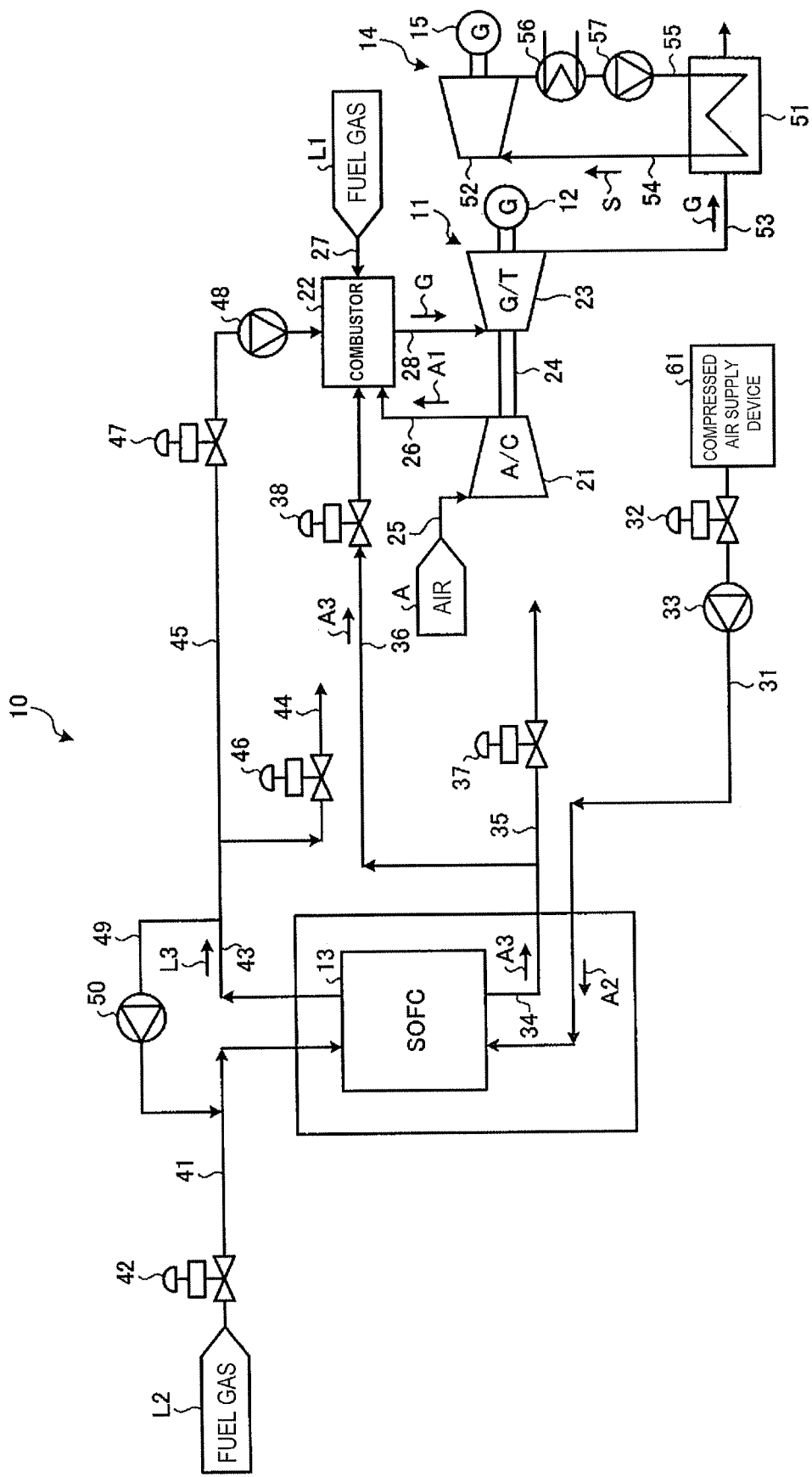
FIG. 2 is a schematic view illustrating the power generation system according to the first embodiment.

FIG. 1 is a schematic view illustrating a compressed air supply line in the power generation system according to the first embodiment of the present invention, and FIG. 2 is a schematic view of the configuration of the power generation system according to the first embodiment.

As illustrated in FIG. 2, in the first embodiment, a power generation system 10 comprises a gas turbine 11, a generator 12, an SOFC 13, a steam turbine 14, and a generator 15. The power generation system 10 is configured to achieve high power generation efficiency by combining the power generation by the gas turbine 11, the power generation by the SOFC 13, and the power generation by the steam turbine 14.

The gas turbine 11 includes a compressor 21, a combustor 22, and a turbine 23, and the compressor 21 and the turbine 23 are connected by a rotary shaft 24 so that they rotate integrally. The compressor 21 compresses air A that is drawn in from an air intake line 25. The combustor 22 mixes and burns compressed air (first compressed air) A1 supplied from the compressor 21 via a first compressed air supply line 26 and fuel gas L1 supplied via a first fuel gas supply line 27. The turbine 23 is rotated by exhaust gas (combustion gas) G supplied from the combustor 22 via an exhaust gas supply line 28. Although not illustrated on the drawings, the compressed air A1 compressed by the compressor 21 is supplied to the casing of the turbine 23, and the compressed air A1 cools the blades and the like as cooling air. The generator 12 is provided coaxially with the turbine 23, and can generate power by the rotation of the turbine 23. Note that here, for example, liquefied natural gas (LNG) is used as the fuel gas L1 supplied to the combustor 22.

The SOFC 13 is supplied with high-temperature fuel gas as a reductant and high-temperature air (oxygen gas) as an oxidant, which react at a predetermined operating temperature to generate power. The SOFC 13 is configured from an air electrode, a solid electrolyte, and a fuel electrode, housed within a pressure vessel. Power is generated by supplying compressed air to the air electrode and supplying fuel gas to the fuel electrode. The fuel gas L2 supplied to the SOFC 13 is, for example, liquefied natural gas (LNG).

A compressed air supply device (compressed air supply unit) 61 is linked to the SOFC 13 via the second compressed air supply line 31, allowing compressed air (second compressed air) A2 compressed by the compressed air supply device 61 to be supplied to an inlet of the air electrode. A control valve (first on/off valve) 32 that can adjust the flow rate of the air supplied, and a blower 33 that can increase the pressure of the compressed air A2 are provided along an air flow direction on the second compressed air supply line 31. An exhaust air line 34 into which exhaust air A3 that was used at the air electrode is discharged is connected to the SOFC 13. The exhaust air line 34 branches into an exhaust line 35 that discharges to the outside exhaust air A3 that was used at the air electrode, and a compressed air circulation line 36 that is connected to the combustor 22. A control valve 37 that can adjust the flow rate of the air discharged is provided on the exhaust line 35, and a control valve 38 that can adjust the flow rate of the circulating air is provided on the compressed air circulation line 36.

Also, a second fuel gas supply line 41 is provided on the SOFC 13 to supply the fuel gas L2 to the inlet of the fuel electrode. A control valve 42 that can adjust the supplied fuel gas flow rate is provided on the second fuel gas supply line 41. The SOFC 13 is connected to an exhaust fuel line 43 in which exhaust fuel gas L3 that was used at the fuel electrode is discharged. The exhaust fuel line 43 branches into an exhaust line 44 that discharges to the outside, and an exhaust fuel gas supply line 45 connected to the combustor 22. A control valve 46 that can adjust the flow rate of the fuel gas discharged is provided on the exhaust line 44, and a control valve 47 that can adjust the flow rate of the fuel gas supplied and a blower 48 that can increase the pressure of the fuel are provided on the exhaust fuel gas supply line 45 along the flow direction of the fuel gas L3.

Also, a fuel gas recirculation line 49 is provided on the SOFC 13 connecting the exhaust fuel line 43 and the second fuel gas supply line 41. A recirculation blower 50 that recirculates the exhaust fuel gas L3 of the exhaust fuel line 43 to the second fuel gas supply line 41 is provided on the fuel gas recirculation line 49.

A turbine 52 of the steam turbine 14 is rotated by steam generated by an exhaust heat recovery boiler 51 (HRSG). The exhaust heat recovery boiler 51 is connected to an exhaust gas line 53 from the gas turbine 11 (turbine 23), and generates steam S by heat exchange between air and high-temperature exhaust gas G. A steam supply line 54 and a water supply line 55 are provided between the steam turbine 14 (turbine 52) and the exhaust heat recovery boiler 51. A condenser 56 and a water supply pump 57 are provided on the water supply line 55. The generator 15 is provided coaxially with the turbine 52, and can generate power by the rotation of the turbine 52. The exhaust gas from which the heat has been recovered in the exhaust heat recovery boiler 51 is discharged to the atmosphere after removal of harmful substances.

The compressed air supply system of the power generation system 10 according to the first embodiment described above will now be described in detail. As illustrated in FIG. 1, the power generation system 10 according to the first embodiment is provided with a compressed air supply device (compressed air supply unit) 61 capable of generating compressed air, and a second compressed air supply line 31 for supplying compressed air compressed by the compressed air supply device 61 to the SOFC 13.

Specifically, the compressed air supply device 61, which is capable of stand-alone operation, is provided separately from the compressor 21 of the gas turbine 11, with the compressor 21 supplying compressed air only to the combustor 22 (turbine 23) via the first compressed air supply line 26 and the compressed air supply device 61 supplying compressed air only to the SOFC 13 via the second compressed air supply line 31. Therefore, total quantity of the compressed air compressed by the compressor 21 is delivered to the combustor 22 and the turbine 23, and total quantity of compressed air compressed by the compressed air supply device 61 is delivered to the SOFC 13. As a result, fluctuations in the operating state of the gas turbine 11 are not transmitted to the SOFC 13, allowing the SOFC 13 to operate stably. Specifically, the SOFC 13 generates power as the result of the compressed air A2 being supplied to the air electrode and the fuel gas L2 being supplied to the fuel electrode. In this case, if the pressure in the air electrode and the pressure in the fuel electrode are not roughly equal, a flow of compressed air A2 or fuel gas L2 between the air electrode and the fuel electrode will be generated, causing the temperature of the SOFC 13 to fluctuate. In the present embodiment, the compressed air A1 compressed by the compressor 21 is not supplied to the SOFC 13; rather, only compressed air A2 compressed by the compressed air supply device 61 is supplied to the SOFC 13, eliminating fluctuations in the pressure in the air electrode of the SOFC 13, and allowing the SOFC 13 to operate stably.

The compressed air supply device 61 is constituted by an SOFC compressor (fuel cell compressor) 62 and an SOFC steam turbine (fuel cell steam turbine) 63 linked by a coupling shaft 64 so as to be capable of integral rotation. One end of the second compressed air supply line 31 is connected to the SOFC compressor 62 and the other end is connected to the SOFC 13, and the SOFC compressor 62 compresses air taken in via an air intake line 65. The SOFC compressor 62 is driven by the rotation of the SOFC steam turbine 63 by steam generated by the heat recovery steam generator 51, and is capable of compressing air. Specifically, one end of a steam supply line 66 is connected to the steam supply line 54 for supplying steam from the heat recovery steam generator 51 to the steam turbine 14 (turbine 52), and the other end is connected to the SOFC steam turbine 63. The steam supply line 66 is provided with a control valve 67 that is capable of adjusting the amount of supplied steam.

A control device 68 is at least capable of adjusting the degree of opening of the control valve 32 and the control valve 67 and controlling the driving and stopping of the blower 33. Thus, when the SOFC 13 is operating normally, the control device 68 opens the control valves 32, 67 and supplies steam generated by the heat recovery steam generator 51 to the SOFC steam turbine 63 via the steam supply line 54 to drive the SOFC compressor 62.

A bypass line 71 is provided that connects the first compressed air supply line 26 and the second compressed air supply line 31, and the bypass line 71 is provided with a control valve (second on/off valve) 72 that is capable of adjusting the flow rate of compressed air. The control device 68 is capable of adjusting the degree of opening of the control valve 72. Specifically, when the SOFC 13 is operating normally, the control device 68 closes the control valve 72 so that compressed air A2 generated by the compressed air supply device 61 is not supplied to the gas turbine 11, but is only supplied to the SOFC 13. Conversely, when the SOFC 13 is stopped, the control valve 72 is opened and the control valve 32 is closed so that compressed air generated by the compressed air supply device 61 is not supplied to the SOFC 13, but is only supplied to the gas turbine 11.

The following is a description of the operation of the power generation system 10 according to the first embodiment. As illustrated in FIGS. 1 and 2, when the power generation system 10 is activated, the gas turbine 11, steam turbine 14, and SOFC 13 are activated in that order. The control device 68 is capable of controlling not only the control valve 32 and the control valve 67, but also the other control valves.

First, in the gas turbine 11, the compressor 21 compresses the air A, and the combustor 22 mixes and burns the compressed air A1 and the fuel gas L1, the turbine 23 is rotated by the exhaust gas G, and the generator 12 starts to generate power. Next, in the steam turbine 14, the turbine 52 is rotated by the steam S generated by the exhaust heat recovery boiler 51, and, as a result, the generator 15 starts to generate power.

Next, in the SOFC 13, the control valve 67 is opened so that steam generated by the heat recovery steam generator 51 is supplied via the steam supply line 66 to the SOFC steam turbine 63 of the compressed air supply device 61. The SOFC steam turbine 63 then begins to rotate due to the supplied steam, and the SOFC compressor 62 is rotatably driven in sync, compressing the air A taken in via the air intake line 65. The SOFC compressor 62 then supplies compressed air A2 to the SOFC 13 via the second compressed air supply line 31, and the pressure begins to increase.

At this time, with the control valve 37 of the exhaust line 35 and the control valve 38 of the compressed air circulation line 36 closed and the blower 33 of the second compressed air supply line 31 stopped, the control valve 32 is opened. Compressed air A2 compressed by the compressed air supply device 61 is then supplied to the SOFC 13 side via the second compressed air supply line 31. In this way, the pressure on the SOFC 13 side increases due to the supply of the compressed air A2.

On the other hand, in the SOFC 13, the fuel gas L2 is supplied to the fuel electrode side and the pressure starts to rise. With the control valve 46 of the exhaust line 44 and the control valve 47 of the exhaust fuel gas supply line 45 closed, and the blower 48 stopped, the control valve 42 of the second fuel gas supply line 41 is opened, and the recirculation blower 50 of the fuel gas recirculation line 49 is driven. Then, the fuel gas L2 is supplied to the SOFC 13 side from the second fuel gas supply line 41, and the exhaust fuel gas L3 is recirculated by the fuel gas recirculation line 49. In this way, the pressure on the SOFC 13 side increases due to the supply of the fuel gas L2.

When the pressure on the air electrode side of the SOFC 13 reaches a predetermined pressure, the control valve 32 is fully opened, and the blower 33 is driven. At the same time, the control valve 37 is opened and the exhaust air A3 from the SOFC 13 is discharged from the exhaust line 35. Then, the compressed air A2 is supplied to the SOFC 13 side by the blower 33. At the same time, the control valve 46 is opened and the exhaust fuel gas L3 from the SOFC 13 is discharged from the exhaust line 44. Then, when the pressure of the air electrode side and the pressure of the fuel electrode side of the SOFC 13 reach the target pressure, pressurization of the SOFC 13 is completed.

In the present embodiment, a compressed air supply device 61 and a blower 33 are provided, but the blower 33 may be omitted by controlling the compressed air supply device 61. Specifically, the degree of opening of the control valve 67 may be adjusted so as to adjust the amount of steam supplied to the SOFC steam turbine 63, and the amount of compressed air A2 generated by the SOFC compressor 62 may be adjusted so as to adjust the amount of compressed air A2 supplied to the SOFC 13 and increase the pressure in the SOFC 13. In this case, the omission of the blower 33 eliminates the need to open and close the control valve 32 and activate the blower 33, allowing for reduced costs.

Then, when the reaction (power generation) of the SOFC 13 is stable and the components of the exhaust air A3 and the exhaust fuel gas L3 are stable, the control valve 37 is closed, and the control valve 38 is opened. Then, the exhaust air A3 from the SOFC 13 is supplied to the combustor 22 from the compressed air circulation line 36. Also, the control valve 46 is closed, the control valve 47 is opened, and the blower 48 is driven. Then, the exhaust fuel gas L3 from the SOFC 13 is supplied to the combustor 22 from the exhaust fuel gas supply line 45. At this time, the flow rate of the fuel gas L1 supplied to the combustor 22 from the first fuel gas supply line 27 is reduced.

At this time, total quantity of the compressed air A1 compressed by the compressor 21 is supplied to the combustor 22 and the turbine 23 of the gas turbine 11, and total quantity of the compressed air A2 compressed by the compressed air supply device 61 is supplied to the SOFC 13. Thus, even if a fluctuation in the output of the gas turbine 11 occurs and the pressure of the air A1 compressed by the compressor 21 fluctuates, there is no fluctuation in the pressure of the air A2 supplied to the SOFC 13. As a result, there is no fluctuation in the pressure in the air electrode of the SOFC 13, the pressure in the air electrode and the pressure in the fuel electrode are roughly equal, and the SOFC 13 is stably operated regardless of the operating state of the gas turbine 11.

When the SOFC 13 stops operating, the control device 68 opens the control valve 72 and closes the control valve 32 when the SOFC 13 is stopped, so that the compressed air A2 generated by the compressed air supply device 61 is supplied not to the SOFC 13, but to the gas turbine 11. When the SOFC 13 is operating normally, the compressed air A2 generated by the compressed air supply device 61 is supplied to the SOFC 13 and the used exhaust air A3 is supplied to the combustor 22 of the gas turbine 11 via the compressed air circulation line 36. Thus, when the operation of the SOFC 13 is stopped, the compressed air A2 generated by the compressed air supply device 61 is not supplied to the SOFC 13, but is supplied directly to the combustor 22 of the gas turbine 11 via the bypass line 71. As a result, roughly equal amounts of compressed air A2 are supplied to the gas turbine 11 both when the SOFC 13 is operating normally and when it is stopped, allowing for stable power generation by enabling full-load operation. Because exhaust fuel gas from the SOFC 13 is not supplied to the combustor 22 of the gas turbine 11 when the operation of the SOFC 13 is stopped, the amount of fuel gas supplied via the first fuel gas supply line 27 must be increased.

As described above, the power generation system according to the first embodiment comprises the gas turbine 11 having the compressor 21, the combustor 22, and the turbine 23, the first compressed air supply line 26 for supplying compressed air compressed by the compressor 21 to the combustor 22, the SOFC 13 having the air electrode and the fuel electrode, the compressed air supply device 61 capable of generating compressed air, and the second compressed air supply line 31 for supplying compressed air compressed by the compressed air supply device 61 to the SOFC 13.

Accordingly, the compressed air supply device 61 is provided separately from the compressor 21 of the gas turbine 11, air A1 compressed by the compressor 21 is supplied to the combustor 22 via the first compressed air supply line 26, and air A2 compressed by the compressed air supply device 61 is supplied to the SOFC 13 via the second compressed air supply line 31. Therefore, there is no fluctuation in the pressure of the air supplied to the SOFC 13 even if the pressure of the air supplied to the combustor 22 fluctuates according to the operating state of the gas turbine 11. As a result, there is no fluctuation in the pressure in the air electrode of the SOFC 13, the pressure in the air electrode and the pressure in the fuel electrode are roughly equal, and the SOFC 13 can be stably operated regardless of the operating state of the gas turbine 11.

The power generation system according to the first embodiment is provided with the heat recovery steam generator 51 for generating steam using exhaust gas from the gas turbine 11 and the steam turbine 14 driven by the steam generated by the heat recovery steam generator 51, and the compressed air supply device 61 is provided with an SOFC compressor 62 and a steam supply line 66 for supplying steam generated by the heat recovery steam generator 51 to the SOFC steam turbine 63. Accordingly, when steam generated by the heat recovery steam generator 51 is supplied to the SOFC steam turbine 63 via the steam supply line 66, the SOFC steam turbine 63 is driven by the steam so that the SOFC compressor 62 is driven to generate compressed air A2, which is supplied to the SOFC 13. The power generation system 10 combines the SOFC 13, the gas turbine 11, and the steam turbine 14, and steam generated within the power generation system 10 is used to drive the SOFC compressor 62 to generate compressed air A2 which is supplied to the SOFC 13, thereby allowing overall system efficiency to be increased.

The power generation system of the first embodiment is provided with the control valve 32 capable of opening and closing the second compressed air supply line 31, the bypass line 71 connecting the first compressed air supply line and the second compressed air supply line 31, and the control valve 72 for opening and closing the bypass line 71. Accordingly, the compressed air A2 generated by driving the SOFC compressor 62 can be supplied to the combustor 22 via the bypass line 71, allowing the amount of compressed air to be adjusted according to the operating state of the gas turbine 11 or the SOFC 13.

The power generation system of the first embodiment is provided with the control device 68 capable of opening and closing the control valve 32 and the control valve 72, and, when the SOFC 13 is stopped, the control device 68 closes the control valve 32 and opens the control valve 72. Accordingly, when the SOFC 13 is stopped, the control valve 32 is closed to stop the supply of compressed air A2 from the compressed air supply device 61 to the SOFC 13, and the control valve 72 is opened to begin supplying compressed air A2 from the compressed air supply device 61 to the combustor 22 of the gas turbine 11, ensuring the amount of compressed air provided to the gas turbine 11 and allowing the gas turbine 11 to operate stably.

Second Embodiment

Figure 3:
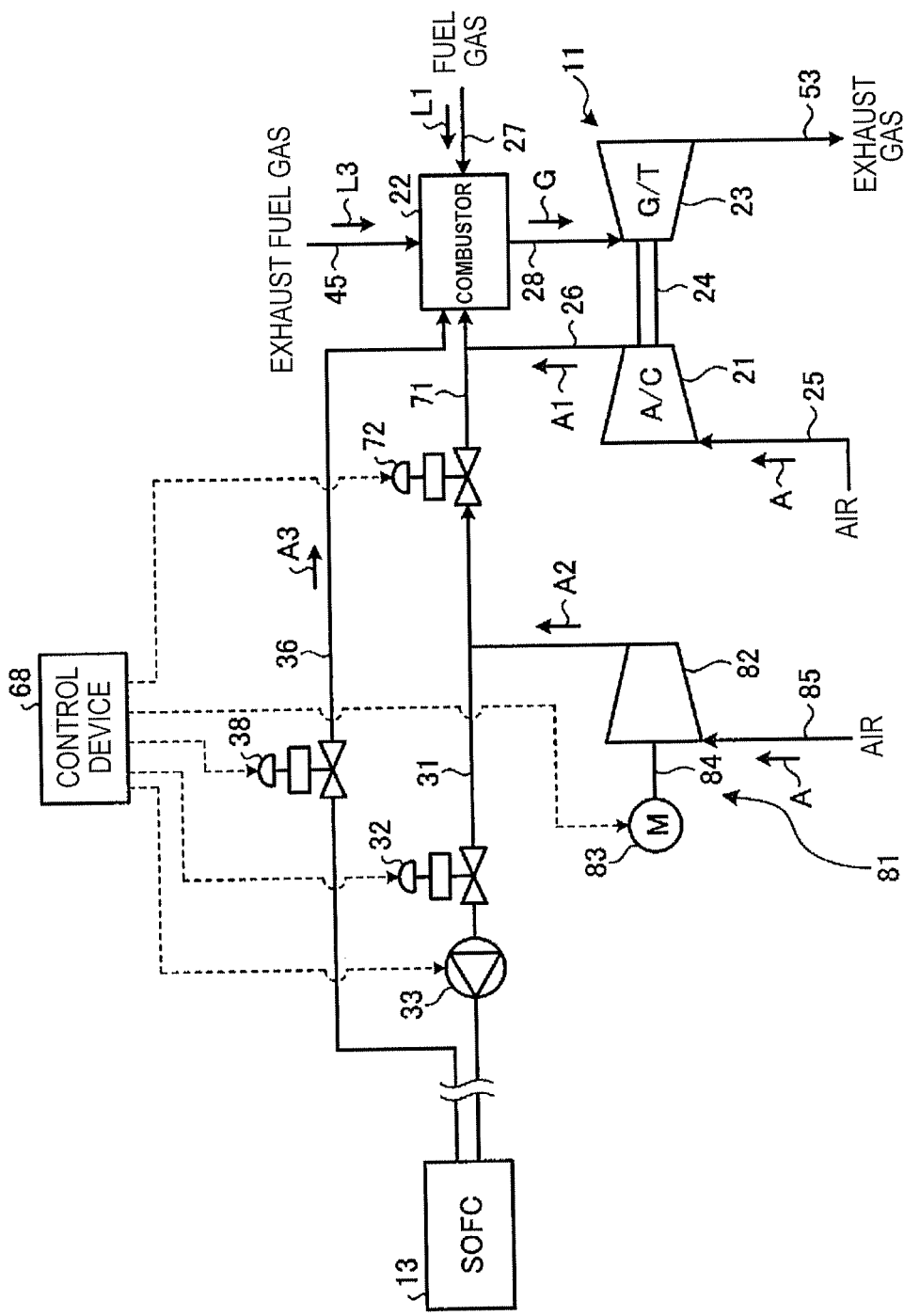
FIG. 3 is a schematic view illustrating a compressed air supply line in a power generation system according to a second embodiment of the present invention.

FIG. 3 is a schematic view illustrating a compressed air supply line in a power generation system according to a second embodiment of the present invention. The basis configuration of the power generation system according to the present embodiment is roughly identical to that of the first embodiment described above; thus, for parts described using FIG. 2 and having similar functions as in the first embodiment described above, the same reference numerals are used, and detailed description thereof will be omitted.

In the power generation system of the second embodiment, as illustrated in FIGS. 2 and 3, a compressed air supply device (compressed air supply unit) 81 is linked to the SOFC 13 via the second compressed air supply line 31, the compressed air supply device 81 being capable of supplying compressed air A2 to an inlet of the air electrode. Specifically, the compressed air supply device 81, which is capable of stand-alone operation, is provided separately from the compressor 21 of the gas turbine 11, with the compressor 21 supplying compressed air A1 only to the combustor 22 (turbine 23) via the first compressed air supply line 26 and the compressed air supply device 81 supplying compressed air A2 only to the SOFC 13 via the second compressed air supply line 31. Therefore, the total quantity of compressed air compressed by the compressor 21 is delivered to the combustor 22 and the turbine 23, and the total quantity of compressed air compressed by the compressed air supply device 81 is delivered to the SOFC 13. As a result, fluctuations in the operating state of the gas turbine 11 are not transmitted to the SOFC 13, allowing the SOFC 13 to operate stably.

The compressed air supply device 81 is constituted by an SOFC compressor (fuel cell compressor) 82 and a drive motor 83 linked by a coupling shaft 84. One end of the second compressed air supply line 31 is connected to the SOFC compressor 82 and the other end is connected to the SOFC 13, and the SOFC compressor 82 compresses air taken in via an air intake line 85. The SOFC compressor 82 is driven by power being supplied to the drive motor 83, and is capable of compressing air.

The control device 68 is at least capable of adjusting the degrees of opening of the control valve 32 and the control valve 72 and controlling the driving and stopping of the drive motor 83. Thus, when the SOFC 13 is operating normally, the control device 68 opens the control valves 32, 67, and the drive motor 83 is driven to drive the SOFC compressor 82.

A bypass line 71 is provided that connects the first compressed air supply line 26 and the second compressed air supply line 31, and the bypass line 71 is provided with a control valve 72 that is capable of adjusting the flow rate of compressed air. When the SOFC 13 is operating normally, the control device 68 closes the control valve 72 so that compressed air generated by the compressed air supply device 81 is not supplied to the gas turbine 11, but is only supplied to the SOFC 13. Conversely, when the SOFC 13 is stopped, the control valve 72 is opened and the control valve 32 is closed so that compressed air generated by the compressed air supply device 81 is not supplied to the SOFC 13, but is only supplied to the gas turbine 11.

When the power generation system described above is activated, the gas turbine 11, steam turbine 14, and SOFC 13 are activated in that order; however, the SOFC 13 may also be activated before the gas turbine 11.

When operating the SOFC 13, the drive motor 83 is driven so as to rotatably drive the SOFC compressor 82, compressing air A taken in via the air intake line 85. The SOFC compressor 82 then supplies compressed air A2 to the SOFC 13 via the second compressed air supply line 31. Meanwhile, the control valve 42 of the second fuel gas supply line 41 is opened, thereby supplying fuel gas L2 to the SOFC 13 via the second fuel gas supply line 41. The compressed air A2 and the fuel gas L2 then react in the SOFC 13, generating power.

At this time, total quantity of the air A1 compressed by the compressor 21 is supplied to the combustor 22 and turbine 23 of the gas turbine 11, and total quantity of the air A2 compressed by the compressed air supply device 81 is supplied to the SOFC 13. Thus, even if a fluctuation in the output of the gas turbine 11 occurs and the pressure of the air A1 compressed by the compressor 21 fluctuates, there is no fluctuation in the pressure of the air A2 supplied to the SOFC 13, and the SOFC 13 is operated stably regardless of the operating state of the gas turbine 11.

As described above, the power generation system according to the second embodiment is provided with the gas turbine 11 having the compressor 21, the combustor 22, and the turbine 23, the first compressed air supply line 26 for supplying compressed air compressed by the compressor 21 to the combustor 22, the SOFC 13 having the air electrode and the fuel electrode, the compressed air supply device 81 capable of generating compressed air, and the second compressed air supply line 31 for supplying compressed air compressed by the compressed air supply device 81 to the SOFC 13.

Accordingly, the compressed air supply device 81 is provided separately from the compressor 21 of the gas turbine 11, air A1 compressed by the compressor 21 is supplied to the combustor 22 via the first compressed air supply line 26, and air A2 compressed by the compressed air supply device 81 is supplied to the SOFC 13 via the second compressed air supply line 31. Therefore, there is no fluctuation in the pressure of the air supplied to the SOFC 13 even if the pressure of the air supplied to the combustor 22 fluctuates according to the operating state of the gas turbine 11. As a result, the SOFC 13 can be stably operated regardless of the operating state of the gas turbine 11.

In the power generation system according to the second embodiment, the compressed air supply device 81 is provided with the SOFC compressor 82 and the drive motor 83 for driving the SOFC compressor 82. Accordingly, the SOFC compressor 82 is driven by the drive motor 83 to generate compressed air A2, which is supplied to the SOFC 13. Simply by providing the drive motor 83 and the SOFC compressor 82, compressed air A2 can be supplied to the SOFC 13 independently of the gas turbine 11, allowing stable operation of the SOFC 13 to be ensured using a simple configuration.

In the embodiments described above, the first on-off valve and the second on-off valve of the present invention are control valves 32, 72 capable of adjusting flow rate, but these valves may be also be cutoff valves incapable of adjusting flow rate.

REFERENCE SIGNS LIST

10 Power generation system
11 Gas turbine

12 Generator
13 Solid oxide fuel cell (SOFC)
14 Steam turbine
15 Generator
21 Compressor
22 Combustor
23 Turbine
26 First compressed air supply line
27 First fuel gas supply line
31 Second compressed air supply line
32 Control valve (first on-off valve)
33 Blower
34 Exhaust air line
36 Compressed air circulation line
41 Second fuel gas supply line
42 Control valve
43 Exhaust fuel line
45 Exhaust fuel gas supply line
49 Fuel gas recirculation line
61 Compressed air supply device (compressed air supply unit)
62 SOFC compressor (fuel cell compressor)
63 SOFC steam turbine (fuel cell steam turbine)
66 Steam supply line
67 Control valve
71 Bypass line
72 Control valve (second on-off valve)

The invention claimed is:

1. A power generation system comprising:
a gas turbine having a first compressor and a combustor;
a first compressed air supply line for supplying first compressed air compressed by the compressor to the combustor;
a fuel cell having an air electrode and a fuel electrode;
a second compressor separated from the first compressor of the gas turbine;
a second compressed air supply line for supplying second compressed air compressed by the second compressor to the fuel cell;
a first on/off valve for opening and closing the second compressed air supply line;
a bypass line connecting the first compressed air supply line and the second compressed air supply line; and
a second on/off valve for opening and closing the bypass line.

* * * * *